(12) United States Patent
Supèr et al.

(10) Patent No.: US 11,175,184 B2
(45) Date of Patent: Nov. 16, 2021

(54) MULTI-ANGLE COATING COMPOSITION COLOR STRENGTH MEASUREMENT

(71) Applicant: SWIMC LLC, Cleveland, OH (US)

(72) Inventors: Hendrika T. J. Supèr, Wolvega (NL); Klaas H. De Haas, Lelystad (NL)

(*) Notice: Subject to any disclaimer, the term of this patent is extended or adjusted under 35 U.S.C. 154(b) by 0 days.

(21) Appl. No.: 16/615,919

(22) PCT Filed: May 23, 2018

(86) PCT No.: PCT/US2018/034096
§ 371 (c)(1),
(2) Date: Nov. 22, 2019

(87) PCT Pub. No.: WO2018/217867
PCT Pub. Date: Nov. 29, 2018

(65) Prior Publication Data
US 2020/0096390 A1 Mar. 26, 2020

Related U.S. Application Data

(60) Provisional application No. 62/510,516, filed on May 24, 2017.

(51) Int. Cl.
*G01J 3/50* (2006.01)
*B05D 5/06* (2006.01)
(Continued)

(52) U.S. Cl.
CPC ............. *G01J 3/504* (2013.01); *B05D 5/065* (2013.01); *G01J 3/10* (2013.01); *G01J 3/14* (2013.01); *G01J 3/18* (2013.01); *G01N 21/255* (2013.01)

(58) Field of Classification Search
CPC ..... G01J 3/504; G01J 3/10; G01J 3/46; B05D 5/065; G01N 21/57
See application file for complete search history.

(56) References Cited

U.S. PATENT DOCUMENTS 3,916,168 A * 10/1975 McCarty ................. G01J 3/504
356/405
10,895,505 B2 * 1/2021 Frick ...................... G01J 3/0297
(Continued)

OTHER PUBLICATIONS

Extended European Search Report for EP Application No. 18806687.2, dated Feb. 10, 2021, 7 pages.
(Continued)

*Primary Examiner* — Maurice C Smith
(74) *Attorney, Agent, or Firm* — Patterson Thuente Pedersen, P.A.

(57) ABSTRACT

The color strength of a colored batch containing effect pigments can be measured and corrected using one or more non-uniformly weighted factors to determine, at a plurality of combinations of illumination angles and measurement angles, and at one or more wavelengths, the color and intensity of light reflected or absorbed by a coating film made from the batch in comparison to a reference color strength. Based on such comparison, let-downs or batches may be passed, rejected, mixed or otherwise dispersed. The composition of such let-downs or batches may also or instead be adjusted by adding non-effect pigments, effect pigments, binder, carrier, binder, or non-effect or effect pigments dispersed in either or both of a carrier and binder, in order to correct the let-down or batch color strength to within a desired tolerance of the reference color strength.

20 Claims, 6 Drawing Sheets

(51) Int. Cl.
*G01J 3/10* (2006.01)
*G01J 3/14* (2006.01)
*G01J 3/18* (2006.01)
*G01N 21/25* (2006.01)

(56) References Cited

U.S. PATENT DOCUMENTS

| | | | |
|---|---|---|---|
| 2002/0118357 A1* | 8/2002 | Torfs | G01N 21/25 |
| | | | 356/128 |
| 2002/0174804 A1 | 11/2002 | Rodrigues et al. | |
| 2008/0052023 A1* | 2/2008 | Kettler | G01J 3/462 |
| | | | 702/82 |
| 2014/0195189 A1* | 7/2014 | Norris | G01N 21/255 |
| | | | 702/104 |
| 2014/0242271 A1 | 8/2014 | Prakash et al. | |

OTHER PUBLICATIONS

Joseph Koleske, Mass Color and Tinting Strength of Pigments, Paint and Coating Testing Manual, Jan. 2012, 8 pages.

* cited by examiner

MULTI-ANGLE COATING COMPOSITION COLOR STRENGTH MEASUREMENT

CROSS REFERENCE TO RELATED APPLICATIONS

This application is a national stage filing under 35 U.S.C. § 371 of International Application No. PCT/US2018/034096 filed on May 23, 2018 and entitled "MULTI-ANGLE COATING COMPOSITION COLOR STRENGTH MEASUREMENT", which claims priority to U.S. Provisional Application Ser. No. 62/510,516 filed on May 24, 2017 and entitled "MULTI-ANGLE COATING COMPOSITION COLOR STRENGTH MEASUREMENT", the disclosures of both of which are incorporated herein by reference in their entirety.

FIELD

This invention relates to coating composition manufacturing and quality control.

BACKGROUND

Factory-made coating compositions (e.g., paints) may be supplied with a variety of finished paint surface reflectivities (e.g., gloss, satin, matte, etc.), in a variety of colors, and using a variety of film-forming binders (e.g., latex, alkyd, two component liquid, powder, etc.). Batch production techniques are frequently used to make such compositions. It is important to maintain batch-to-batch consistency in a number of appearance and performance characteristics so that compositions made in different manufacturing lots will match one another before, during and after application. Among such characteristics, color and color strength are especially important, and if inconsistent from batch-to-batch may lead to objections from end users.

Matching of color typically is performed by making spectral reflection measurements, processing the data in software, and applying judgmental factors. A variety of color matching instruments are available from suppliers including Byk-Gardner GmbH, Datacolor and X-Rite, Inc. The attainment of consistent batch-to-batch color is reasonably straightforward and can be at least partially automated.

Matching of color strength (also referred to as tint strength or chromatic color strength) is carried out differently than color matching, owing in part to the dependence of color strength on the extent to which the pigment particles have been dispersed into other coating composition ingredients during the so-called grinding step, on the pigment particle size and extent of pigment wetting in the finished coating composition, and on the generally subjective nature of color strength evaluation. In the grinding step, the pigment(s) and suitable grinding media are combined with a portion of the remaining coating composition ingredients and mixed to deagglomerate and disperse the pigment particles. This may for example be performed using a high-speed mixer, ball mill, bead mill, bar mill or other mixing device. The resulting dispersion is referred to as a "mill base" or "grind", and may be used to manufacture liquid or powder coating compositions. The extent of milling significantly influences color strength. If the mill base or grind has been insufficiently milled, then both it and coating compositions made from it will exhibit low color strength. The mill base or grind color strength will be especially important when the mill base or grind is used as an intermediate product that will be mixed with other components to make a series of final coating composition products.

The mill base or grind can be "let down" (viz., combined) with the remaining coating composition ingredients and further mixed until a finished coating composition having desired qualities is obtained. In paint factories, dispersion quality and the color strength of the finished paint traditionally have been subjectively evaluated by one or more expert technicians who may employ Hegman Grind Gages, drawdowns over hiding charts and other equipment or techniques to complete their assessment.

It is especially difficult to maintain consistent batch-to-batch color strength for coating compositions containing so-called "effect" pigments. Effect pigments provide a sparkling appearance and are widely used, for example, on original equipment manufacturer (OEM) vehicles such as cars, trucks and buses to provide metallic paint finishes. The appearance of coating compositions containing effect pigments may vary significantly depending upon the observation angle and illumination conditions, and consequently there may be small but nonetheless significant differences of opinion between expert technicians regarding the perceived color strength of a particular colored batch containing effect pigments.

From the foregoing, it will be appreciated that what is needed in the art are improved color strength measurement techniques. Such techniques and their use in the manufacture of paints and other coating compositions are disclosed and claimed herein.

SUMMARY OF THE INVENTION

Current color strength measurement techniques typically are based on solid (viz. non-effect) colors, and typically employ so-called 45/0 geometry (illumination at 45° from a 0° normal line drawn perpendicular to the illuminated surface, and detection at 0°), or so-called "D/8" geometry (diffuse illumination using a white integrating sphere, and detection at 8° from normal). Doing so does not take into account the angle dependence of effect pigments.

The present invention provides, in one aspect, a method for measuring color strength of a colored batch, the method comprising:
  a) coating onto a substrate a portion of a first colored batch comprising one or more pigments dispersed in either or both of a carrier and binder, the first colored batch optionally including one or more effect pigments, to form a coated test film;
  b) optionally hardening the test film;
  c) illuminating the test film and measuring the intensity of light reflected or absorbed by the test film at a plurality of combinations of illumination angle and measurement angle, and at one or more wavelengths;
  d) calculating a plurality of color strengths for the test film at such plurality of combinations of illumination angle and measurement angle, and at such one or more wavelengths;
  e) determining a composite color strength for the test film by applying non-uniform weighting factors to such plurality of color strengths.

The above-mentioned steps may be performed together with one or more optional additional steps of:
  f) comparing such composite color strength to one or more historic or contemporary composite color strengths obtained from one or more similarly coated and measured reference films made from one or more previously-prepared or contemporaneously-prepared second (viz., reference) colored batches; or g) performing one or more of accepting, rejecting, mixing, milling or adjusting the composition of a remaining portion of first such colored batch, or optionally adding to such remaining portion non-effect pigments, effect pigments, carrier, binder, or non-effect or effect pigments dispersed in either or both of a carrier and binder, to provide a third colored batch whose similarly-measured composite color strength is within a desired tolerance of the second colored batch composite color strength.

The steps recited above need not be performed all at the same time, at the same location, or in the recited order.

The disclosed method facilitates the manufacture of colored batches having more uniform color strength or a desired color strength.

Although portions of the following disclosure refer to paints, the disclosed method is applicable to coatings in general, including powder coatings and extruded coatings, and especially to coating compositions containing effect pigments.

BRIEF DESCRIPTION OF THE DRAWING

Like reference symbols in the various figures of the drawing indicate like elements. The elements in the drawing are not to scale.

DETAILED DESCRIPTION

Figure 1:
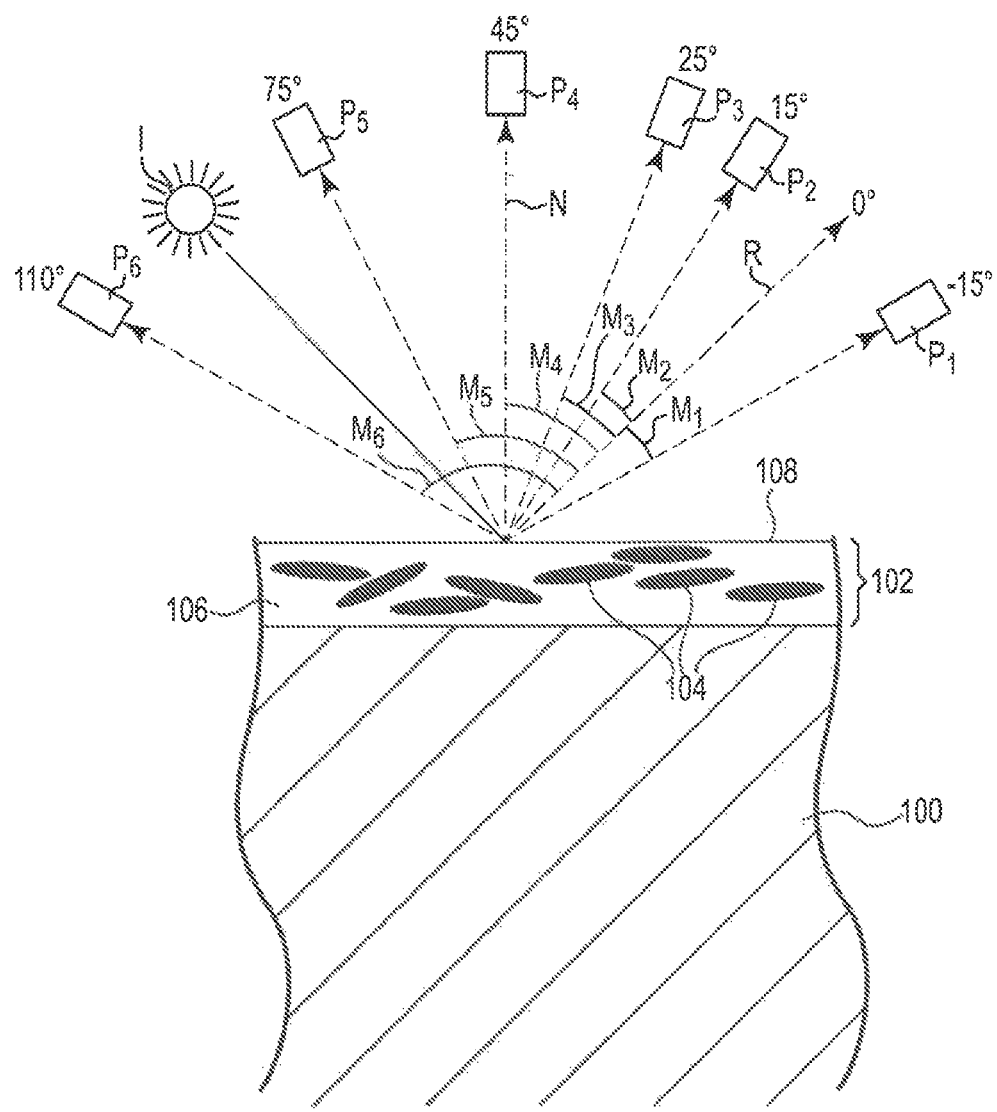
FIG. 1 is a schematic side view showing an illumination angle at 45° from normal and a plurality of measurement angles for use in the disclosed method.

The recitation of a numerical range using endpoints includes all numbers subsumed within that range (e.g., 1 to 5 includes 1, 1.5, 2, 2.75, 3, 3.80, 4, 5, etc.).

The terms "a," "an," "the," "at least one," and "one or more" are used interchangeably. Thus, for example, a paint described as containing "a" pigment contains "one or more" pigments.

The term "average" when used with respect to a set of measurements or values means a number (such as an arithmetic mean, median, mode or other descriptor) that characterizes and represents the central tendency of such set. Unless further specified, the term "average" normally will refer to an arithmetic mean.

The term "binder" means a natural or synthetic polymer suitable for use in a paint or other coating composition.

The term "carrier" when used with respect to a liquid coating composition means a volatile diluent that assists in forming a coating film from the coating composition and which evaporates as the coating composition dries or cures.

The term "chroma" means the radial component $C^*$ of the cylindrical coordinate representation (viz., CIELCh) of the CIE 1976 ($L^*,a^*,b^*$) color space. In more general terms, chroma denotes the extent of colorfulness or color saturation relative to the brightness of a similarly illuminated area that appears to be white or highly transmitting.

The term "colored" when used with respect to a coating composition means having a color other than white or black. The term colored thus includes a coating composition that obtains its coloration from silver-gray pigments. In more general terms, the term colored means having a hue, and in more specific terms colored means having a distinct, non-zero chroma value $C^*$.

The term "colored batch" means, as the context may require, a mill base, grind, let-down or finished coating composition.

The term "diffuse sphere" means a hollow integrating sphere for scattering and measuring incident light, for example an Ulbricht sphere.

The term "effect coating" means a coating composition containing one or more effect pigments and optionally one or more solid non-effect pigments or dyes in a binder, wherein the concentration of solid pigment or dye (if present) in the binder is such that a hardenable layer of the coating on a substrate will provide a translucent medium through which the effect pigments are visible (viz., not fully masked by the solid pigment or dye).

The term "effect pigment" means a collection of solid particles that when dispersed in a suitable binder and evaluated using a multi-angle color measurement exhibit a distinct non-zero color difference between at least two different measurement angles. In more general terms and without the aid of instruments, effect pigment particles dispersed in a finished coating composition layer typically will provide visually perceptible and angle-dependent sparkle or color shift effects.

The term "film-forming" when used with respect to a binder means that upon application of the binder to a substrate (optionally with the assistance of a suitable cosolvent, coalescing solvent or heat), the binder is capable of coalescing or otherwise consolidating to form a continuous film of the binder atop the substrate.

The term "flake" when used with respect to a coated effect pigment refers to generally flat, high aspect ratio (e.g., 10:1 or more) particles having much greater length and width than thickness.

The term "hiding power" when used with respect to an applied and dried or cured layer of a pigment-containing coating composition means that the dried or cured layer contains sufficient pigment or has sufficient layer thickness so as to obscure or substantially obscure an underlying layer. Hiding power may be measured according to ASTM method D-2805, using dried drawdowns on Form 3B Leneta charts prepared at a fixed wet film thickness, to assess whether the applied coating layer will obscure the black portion of the Leneta chart sufficiently so that the coating lightness value $L^*$ over the black portion of the Leneta chart is at least a specified percentage of the coating lightness value $L^*$ over the white portion of the chart. Exemplary hiding power percentages may for example be at least 90%, at least 95% or at least 98% of such coating lightness value $L^*$ over the white portion of the chart for a coating with a 20 micrometer dry film thickness.

The term "hue" when used with respect to a pigment or an applied coating composition means having a color as measured using the $a^*$ and $b^*$ coordinates of the CIE 1976 (CIELab) color space. Exemplary hues include red, green, blue, yellow, orange and violet.

The term "illumination angle" means the angle at which light rays from a light source (e.g., a point, collated or coherent light source) are directed onto a coated substrate. Illumination angles typically are identified with respect to a line drawn normal to the illuminated surface, with a 45° illumination angle being commonly employed. Obtaining a first measurement at a specific measurement angle from a point light source at a specific illumination angle, and obtaining a second measurement at the same measurement angle using a diffuse light source, will be regarded as the use of one measurement angle and two illumination angles.

The term "let-down" means a mixture made by combining a mill base dispersion, or a stirred mixture containing pigment in either or both of a carrier or binder, with additional coating composition ingredients whose color characteristics are known. The mere addition of a carrier or diluent to improve or adjust application characteristics will not however be regarded as making a let-down. The additional coating composition ingredients may include one or multiple pigment types that may be the same as or different from the other pigments present in the mill base dispersion or stirred mixture. Typically, the additional coating composition contains one pigment type, such as a black pigment or a white pigment. The color strength of a let-down may be evaluated in a non-cured state (e.g., bulk, wet or as part of an inline plant measurement) or may be evaluated after a continuous film of the let-down has been applied (for example by spraying, roller, knife coating or other suitable application technique) and dried or cured to form a hardened coating layer.

The term "mass tone" means a mill base dispersion that has not yet been let down (viz., not yet mixed with additional coating composition ingredients).

The term "measurement angle" means the angle at which a reflected light color and intensity or reflected light image capture are obtained using a spectrophotometer, photodetector, camera, colorimeter or other device that can record color information and intensity. Measurement angles may be specified as positive or negative angles with respect to a zero angle drawn orthogonal to a light ray from a point light source operating at a specific illumination angle (such as the 45/0 geometry discussed above), or may be specified with reference to a normal line drawn perpendicular to the illuminated surface (such as the D/8 geometry discussed above). Measurements may be reported based on reflected light or may, through comparison to light from the source, be reported based on absorbed light. Obtaining a first measurement at a specific measurement angle from a point light source at a specific illumination angle, and obtaining a second measurement using a diffuse sphere, and the same measurement angle, will be regarded as the use of a plurality of illumination angles and one measurement angle.

The terms "mill base" and "pigment paste" mean a dispersion of colored pigment and optionally other solid or dissolved ingredients in a suitable carrier.

The term "non-uniform" when used with respect to a plurality of weighting factors means that at least one weighting factor is different from the remaining weighting factors.

The term "paint" means a pigmented film-forming material that can provide a coating on a substrate. Paints include each of primers, intermediate coats, topcoats, stains and other coatings that in general may have a variety of functions (e.g., protective, insulative, reflective or decorative coatings), and include both liquid coating compositions and powder coating compositions. As supplied in a container (e.g., a can, pouch or tote), paints may have a relatively high viscosity, for example more than 1,000 centipoises (viz., more than 1,000 mPa·s). If prepared for spraying, the viscosity may be lower, e.g., less than a few hundred centipoises (viz., less than a few hundred mPa·s).

The terms "polymer" and "polymeric" include homopolymers as well as copolymers of two or more monomers.

The terms "preferred" and "preferably" refer to embodiments of the invention that may afford certain benefits, under certain circumstances. However, other embodiments may also be preferred, under the same or other circumstances.

Furthermore, the recitation of one or more preferred embodiments does not imply that other embodiments are not useful, and is not intended to exclude other embodiments from the scope of the invention.

The term "solvent-borne" when used in respect to a coating composition means that the major liquid carrier for such coating composition is a nonaqueous solvent or mixture of nonaqueous solvents.

The term "tolerance" means a range of permissible variations in a desired measurement or calculation. By way of example, a tolerance of ±5% corresponds to 95 to 105% of a desired measurement or calculation, and a tolerance of ±3% corresponds to 97 to 103% of a desired measurement or calculation.

The term "water-borne" when used in respect to a coating composition means that the major liquid carrier for such coating composition is water.

The term "weighting factors" means coefficients applied to a series of measurements or calculations to assign different contributions by each measurement or calculation to an overall measurement or calculation.

FIG. 1 shows an apparatus and method for measuring reflected light using a single illumination angle, a plurality of measurement angles, and over one wavelength or over a plurality of wavelengths or wavelength ranges. Substrate 100 is coated with paint film 102 containing effect pigment flakes 104 dispersed in a binder 106. Normal line N is orthogonal to surface upper 108 of film 102. Film 102 is illuminated by light source I. Source I may be disposed at a variety of desired illumination angles, and as depicted in FIG. 1 is oriented at 45° with respect to normal line N, and at 90° with respect to specular reflection ray R. Reflection ray R has been assigned an angular reference value of 0°. In the interest of simplicity, the light rays shown in FIG. 1 (and in FIG. 2 and FIG. 3, discussed below) are depicted as reflecting from the upper surface of film 102. As will be appreciated however by persons having ordinary skill in the art, most of the incident light from source I will actually reflect from pigment flakes 104, and a portion of the incident light from source I may reflect from substrate 100. Source I may be a monochromatic source (for example, a laser-emitting diode or other source of coherent light, or light from a prism, holographic or other optical grating, or other diffraction device) that provides illumination at or centered at one wavelength. Source I may also be a polychromatic source that provides illumination at a plurality of wavelengths or wavelength ranges. This may be accomplished in a variety of ways (not individually shown in FIG. 1), for example by moving a plurality of monochromatic sources $I_1$, $I_2$, ... $I_n$ into the position shown for light source I and thereby successively illuminating substrate 100 at a plurality of wavelengths; by appropriately positioning a movable prism or optical grating (e.g., a holographic reflective grating) in the path of light from source I to substrate 100 and thereby successively illuminating substrate 100 at a plurality of wavelengths or wavelength ranges; or by interposing a plurality of colored filters in the path of light from source I to substrate 100 and thereby successively illuminating substrate 100 at a plurality of wavelength ranges. Reflected light color and intensity may be obtained at a variety of measurement angles using one or more fixed or movable photodetectors such as photodetectors at positions $P_1$ through $P_6$ which as depicted in FIG. 1 are oriented at measurement angles $M_1$ through $M_6$ of $-15°$, $15°$, $25°$, $45°$, $75°$ and $110°$ with respect to ray R. The photodetectors at positions $P_1$ through $P_6$ may be broad-spectrum detectors or may each be a plurality of monochromatic detectors that may for example be individually moved into the positions $P_1$ through $P_6$ to thereby successively measure reflection from substrate 100 over a plurality of wavelengths. Movable prisms, optical gratings or filters (not shown in FIG. 1) may also be interposed between substrate 100 and photodetectors in positions $P_1$ through $P_6$ to enable measurement of reflected light at a plurality of wavelengths or wavelength ranges.

Figure 2:
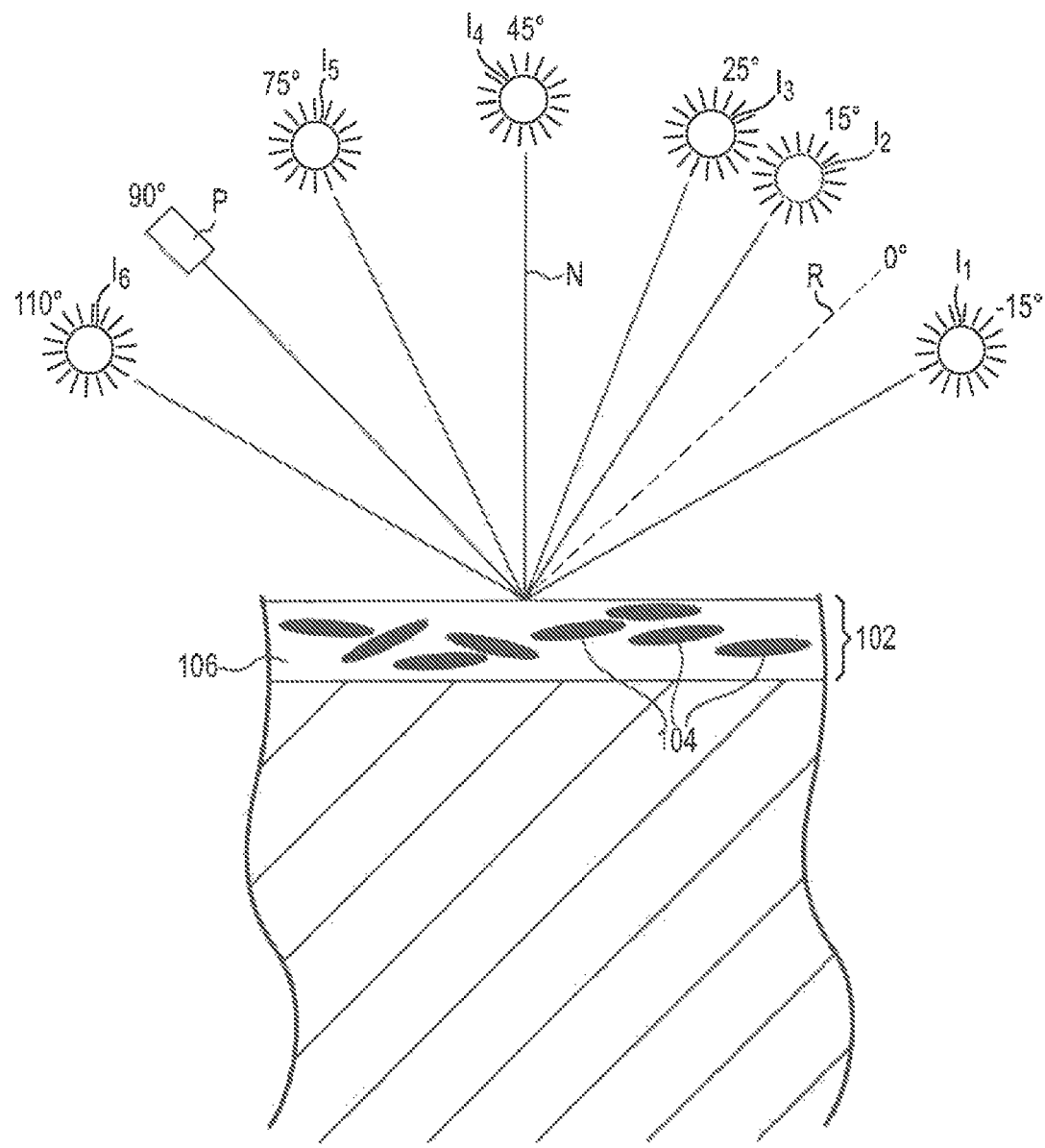
FIG. 2 is a schematic side view showing a plurality of illumination angles and a measurement angle at 45° from normal for use in the disclosed method.

FIG. 2 shows an apparatus and method for measuring reflected light using a plurality of illumination angles, a single measurement angle, and over one wavelength or over a plurality of wavelengths or wavelength ranges. Substrate 100, film 102, pigment flakes 104, upper surface 108 and normal line N are as in FIG. 1. The color and intensity of reflected light from illumination sources $I_1$ through $I_6$ may be obtained using photodetector P. Using the same 0° angular reference employed in FIG. 1, photodetector P is oriented at 90° with respect to the 0° reference R. Illumination sources $I_1$ through $I_6$ are respectively oriented at $-15°$, $15°$, $25°$, $45°$, $75°$ and $110°$ with respect to reference R, and provide corresponding specular reflection rays that in the interest of simplicity are not shown in FIG. 2. Using appropriate multiple monochromatic or polychromatic light sources, photodetectors, movable prisms, gratings or filters like those discussed above in connection with FIG. 1, the FIG. 2 apparatus and method may be used to successively measure reflection from film 102 using a plurality of illumination angles, a single measurement angle, and over one or a plurality of wavelengths or wavelength ranges.

Figure 3:
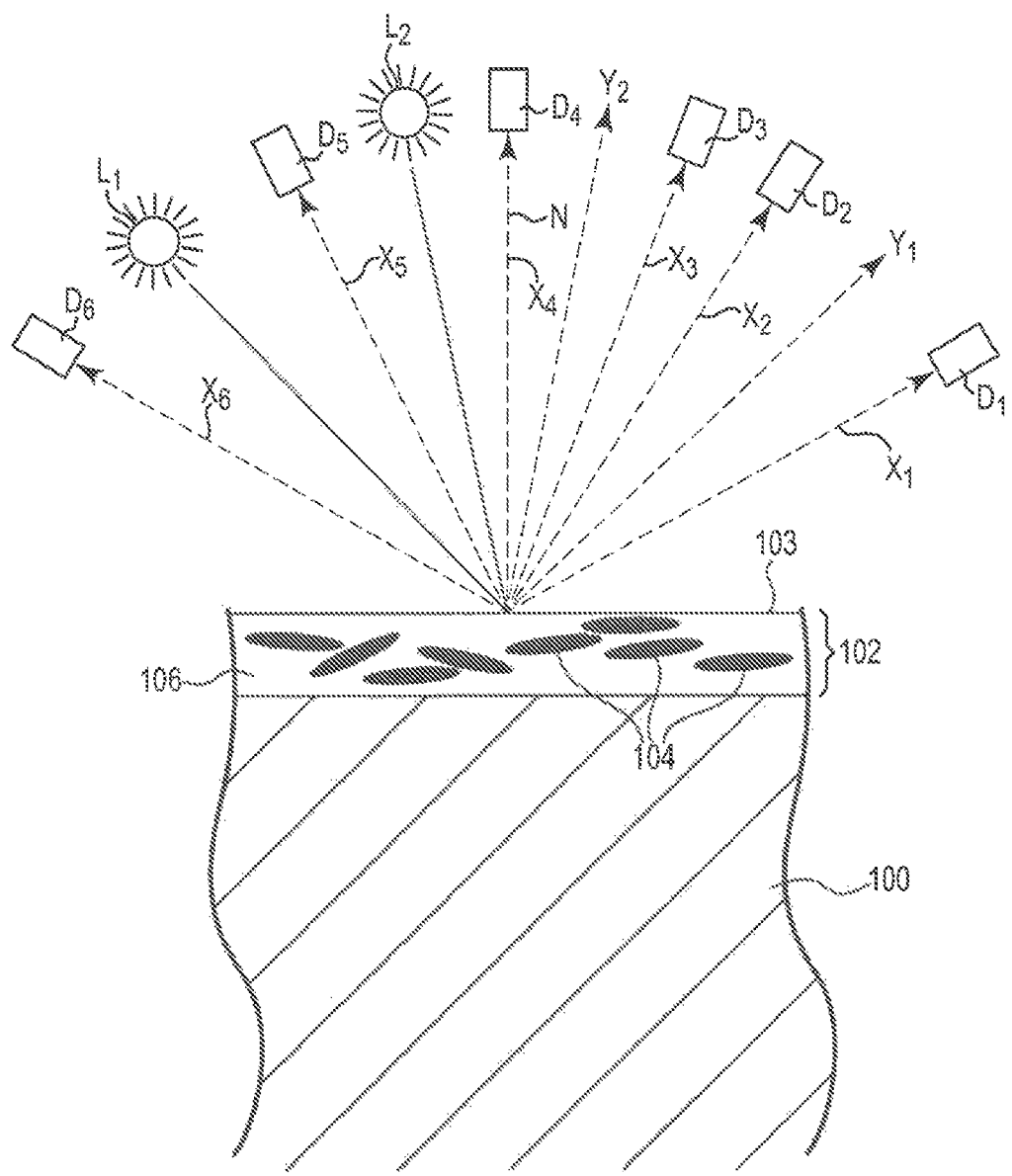
FIG. 3 is a schematic side view showing a plurality of illumination angles and a plurality of measurement angles for use in the disclosed method.

As shown in FIG. 3, the features in FIG. 1 and FIG. 2 may be combined to provide an apparatus and method for measuring reflected light using a plurality of illumination angles, a plurality of measurement angles, and over one or a plurality of wavelengths or wavelength ranges. Substrate 100, film 102, pigment flakes 104, upper surface 108 and normal line N are as in FIG. 1. Illumination sources $L_1$ and $L_2$ provide corresponding specular reflection rays $Y_1$ and $Y_2$. Using the same 0° angular reference employed in FIG. 1 and FIG. 2, illumination sources $L_1$ and $L_2$ are respectively oriented at 90° and 60° with respect to reference reflection ray $Y_1$ (the orientation of which is the same as ray R in FIG. 1), and at 45° and 15° with respect to normal line N. Specular reflection ray $Y_2$ is accordingly located at a reference values of 30° with respect to ray $Y_1$. The color and intensity of reflected rays $X_1$, $X_2$, $X_3$, $X_4$, $X_5$ and $X_6$ may be obtained using one or more photodetectors each at positions $D_1$, $D_2$, $D_3$, $D_4$, $D_5$ and $D_6$ which as depicted in FIG. 2 are oriented at $-15°$, $15°$, $25°$, $45°$, $75°$ and $110°$ with respect to ray $Y_1$, and at $-45°$, $-15°$, $-5°$, $15°$, $45°$ and $80°$ with respect to ray $Y_2$. Using appropriate multiple monochromatic or polychromatic light sources, photodetectors, movable prisms, gratings or filters like those discussed above in connection with FIG. 1 and FIG. 2, the FIG. 3 apparatus and method may be used to successively measure reflection from film 102 using a plurality of illumination angles, a plurality of measurement angles, and over one or a plurality of wavelengths or wavelength ranges.

Color strength evaluation typically will involve coating a portion of a mass tone, let-down or finished coating composition batch onto a substrate to form a continuous film. A variety of substrates and coating techniques may be employed. A preferred substrate and coating technique for liquid coatings is to use the Form 3B Leneta charts and coating procedure discussed above for determination of hiding power. The coated chart can be air dried or subjected to curing conditions appropriate to the chosen binder so as to form a hardened coating film. For powder coatings, a preferred substrate is a metal panel that can withstand powder fusion temperatures, and a preferred coating technique is to apply the powder to the metal panel electrostatically, heat the coated panel at a temperature above the powder melting point until the powder coalesces to form a continuous film, and cool the coated panel.

The coated film can be illuminated at a variety of illumination angles. Using the specular reflection ray R shown in FIG. 1 as a 0° angular reference point, one or more illumination angles from about −30 to 120° may be employed, corresponding to ±75° with respect to normal line N in FIG. 1. Exemplary illumination angles may for example be one or more of −15, 15, 45, 75 90 or 110° with respect to Ray R. The light source may be a point, collated or coherent light source, and may as discussed above provide monochromatic light, a narrow band of wavelengths or a range of wavelengths.

The color and intensity of light reflected or absorbed by the coated film can be measured at a variety of illumination angles. Using the specular reflection ray R shown in FIG. 1 as a zero angle reference point, one or more measurement angles from about −30 to 120° may be employed, corresponding to ±75° with respect to normal line N in FIG. 1. Exemplary measurement angles may for example be one or more of −15, 15, 45, 75 or 110° with respect to Ray R. Measurements made close (e.g., within ±15°) to the maximum gloss angle may be more sensitive to signal noise than measurements made at less close angles. For metallic pigments illuminated at 45° with respect to the normal line N (corresponding to 90° with respect to reference line R), a measurement value obtained at −15° may be numerically very close to a measurement value obtained at 15°, and consequently one or the other of these measurements may be omitted. However, for some effect pigments (e.g., COLORSTREAM™ pigments from E. Merck) there may be significant differences between the values obtained at ±15° and consequently it may be desirable to include measurements at both angles, or to employ illumination at two angles capable of causing similar significant differences in the measured values.

A variety of measurement instruments may be employed including the BYK-MAC™ instrument from Byk-Gardner GmbH, the MA-98™ instrument from X-Rite, Inc. and other instruments that will be familiar to persons having ordinary skill in the art. These instruments typically are used together with manufacturer-supplied data collection and processing software, such as the SMART-LAB™ and BYKWARE SMART-CHART™ programs from Byk-Gardner GmbH and the COLOR IQC™, COLOR IMATCH™ and X-COLOR QC programs from X-Rite, Inc. As supplied, these software programs do not appear to assign non-uniform weighting factors to color strength measurements made at a plurality of measurement angles.

Reflection measurements obtained as described above may if desired be replaced by absorption values (e.g., values derived from reflection measurements). The resulting reflection measurements or absorption values may be used to determine color strengths using a variety of calculation methods. The discussion that follows will focus on calculations made using reflection measurements, it being understood that absorption values may be employed with appropriate adjustment of the formulas.

One exemplary method for calculating color strength, and one which may be used for color strength calculations based on a single measurement geometry, may be referred to as a maximum absorption method. A suitable let-down is made, e.g. by mixing a chosen mill base (viz., a colored batch) with a second pigmented product, for example a product containing white titanium dioxide pigment, to provide a test let-down batch. The test let-down batch is applied to a substrate, and the reflection spectrum is measured with a spectrophotometer. The reflection spectrum may for example be determined at 10 nm wavelength intervals, resulting in 31 reflection values $R^B(\lambda_i)$ between 400 and 700 nm. A second reflection spectrum $R^T(\lambda_i)$, which may have been measured previously, is determined or obtained for a target or reference let-down made using a similar mill base and second pigmented product. The Kubelka-Munk theory may then be used to calculate the ratio of absorption (K) and scattering (S) coefficients for each wavelength j for the test let-down batch using Formula I shown below:

$$\frac{K^B(\lambda_i)}{S^B(\lambda_i)} = \frac{(1-R^B(\lambda_i))^2}{R^B(\lambda_i)} \qquad \mathrm{I}$$

and for the target let-down using Formula II shown below:

$$\frac{K^T(\lambda_i)}{S^T(\lambda_i)} = \frac{(1-R^T(\lambda_i))^2}{R^T(\lambda_i)}. \qquad \mathrm{II}$$

Next, the wavelength $\lambda_{imax}$ for which the ratio of absorption K and scattering S is minimal for the target color is determined using Formula III shown below:

$$\frac{K^T(\lambda_{imax})}{S^T(\lambda_{imax})} = \min\left(\frac{K^T(\lambda_i)}{S^T(\lambda_i)}\right) \qquad \mathrm{III}$$

with the result corresponding to the maximum absorption peak for the given measuring geometry. Next the color strength CS is calculated. For this particular method, color strength is defined using Formula IV shown below for the given measuring geometry:

$$CS = 100 \times \left(\frac{K^B(\lambda_{imax})}{S^B(\lambda_{imax})}\right) / \left(\frac{K^T(\lambda_{imax})}{S^T(\lambda_{imax})}\right). \qquad \mathrm{IV}$$

In the discussion set out above, color strength is determined for a single measuring geometry. If measurements are instead obtained at G different angles, resulting in G different color strength values $CS_g$, then an overall color strength CS might be determined by calculating an average in the form of an arithmetic mean using Formula V shown below:

$$CS = \frac{1}{G}\sum_{g=1}^{G} CS_g. \qquad \mathrm{V}$$

Surprisingly, using this simple average will yield unsatisfying results for colored batches containing effect pigments. Without intending to be bound by theory, there may be several reasons for such unsatisfying results. One reason appears to be that the orientation distribution of effect pigments is affected by pigment concentration differences that may result in an increased apparent color strength for some angles, and a decreased apparent color strength at other angles. Another reason appears to be that some measuring angles may result in more reliable and accurate measurements than other angles due to instrument accuracy and angle dependent color characteristics of the instrument components.

The present invention involves a further determination based on the angle dependence of color strength in colored batches containing effect pigments. A series of color strength calculations is performed for a plurality of illumination or measuring geometries, and one or more non-uniform weighting factors are applied to the resulting color strength calculations to determine a final and more accurate color strength value. This may for example be performed by applying non-uniform weighting factors $W_g$ for each angle to determine the overall color strength using Formula VI shown below:

$$CS = \Sigma_{g=1}^{G} W_g * CS_g \qquad \mathrm{VI}.$$

An important characteristic of the above determination is that at least one of the weighting factors $W_g$ is not the same as the other weighting factors. The disclosed non-uniform weighting factors may be refined by first establishing appropriate consensus color strength measurements using a series (e.g., 2, 3, 4, 5 or more, and up to 20, up to 15 or up to 10) of colored comparison batches and comparison films made from let-downs or coating formulas containing effect pigments and all having the same composition. A panel composed of a plurality (e.g., 2, 3, 4, 5 or more, and up to 20, up to 15 or up to 10) of expert technicians visually evaluate color strength for such colored comparison batches and comparison films, and assign color strengths as a percent of an overall 100 point target value, to provide a consensus (viz., an average) visually-determined color strength for coated comparison films made from the colored comparison batches. Instrumented measurements are obtained as described above for the same coated comparison films, by measuring at a plurality of combinations of illumination angle and measurement angle the color and intensity of light reflected or absorbed by the coated comparison films at one or a plurality of wavelengths. Instrumented color strengths are calculated as described above for two or more such combinations of illumination angle and measurement angle and for one or more or an average of such wavelengths. An appropriate correlation technique (e.g., a linear regression analysis) may be used to determine one or more non-uniform weighting factors to apply to such instrumented color strengths to provide a non-uniformly weighted composite color strength within a desired tolerance of the consensus visually-determined color strength for the comparison films. The extent to which the instrumented color strengths may be used to predict visually-determined color strengths (or vice-versa) may for example be assessed by determining an $R^2$ coefficient of determination value for the regression analysis result. Further analysis may be carried out using non-uniform weighting of the instrumented measurements, so as to improve the degree of correlation as evaluated using $R^2$. The chosen weighting factors may all be positive values, a mixture of positive values and zero values, a mixture of positive values and negative values, or a mixture of positive, zero and negative values. As used in this context, a "zero value" means that the associated measurement is excluded. For a given set of non-uniform weighting factors, their sum will normally be 1. Individual weighting factors may be in some instances be greater than 1 or less than −1.

In a manufacturing setting, the above-described non-uniformly weighted color strength determinations may be used to determine whether a colored batch is or is not within a desired tolerance of a target color strength. If not, the batch may in some instances be subjected to further milling (e.g., a longer grind stage) or other dispersion techniques to bring its color strength within tolerance. The batch may instead or in addition be adjusted by altering its composition (e.g., by mixing the batch with additional components) to bring the color strength to within a desired tolerance of a target color strength. Correction may for example be carried out by adding to the individual colored batch a quantity of effect pigment, non-effect pigment, carrier, binder, or effect pigment or non-effect pigment in either or both of a carrier and binder, so as to raise or lower the color strength of the resulting mixture. The amount to be added may be estimated based on comparison of the remaining batch volume and its color strength to the volume and color strength of the added ingredients. Following the adjustment, the batch may be subjected to additional mixing, milling or other dispersion techniques and its color strength may be reevaluated by carrying out a further instrumented color strength measurement using the disclosed method.

As one exemplary embodiment, the first film may be formed from a let-down of the batch; or a series of first films may be formed by creating multiple let-downs of the same batch or by creating multiple let-downs of the batch and in addition creating a mass tone of the batch. If for example a series of two let-downs is employed, then these may be used to make two first films. These first films may be compared with two second films made from historic or contemporary composite color strengths obtained from two similarly coated and measured reference films made from two previously-prepared or contemporaneously-prepared second (viz., reference) let-downs. Following the taking of non-uniformly weighted instrumented color strength measurements as described above and appropriate correction of the starting batch, additional (viz., third) let-downs and additional (viz., third) films may be made from the corrected batch and measured and compared to the reference films. Comparisons between the let-down(s) and film(s) from the starting batch with the let-down(s) and film(s) from the reference, or comparison of the let-down(s) and film(s) from the corrected batch with the let-down(s) and film(s) from the reference batch, preferably are carried out simultaneously so as to provide a single indication as to how best to adjust or correct the starting batch so as to bring it within the desired tolerance of the reference.

The above-described analysis may be further varied by evaluating one or more subsets of the pigments present in a batch to be measured. For example, when testing a metallic coating composition, it is possible to make a mixture and one or more coated films using a partial (e.g., black) pigment mixture, and separately to make a mixture and one or more coated films using all the pigments that will be present in the completed coating composition (e.g., in a full paint shade). The resulting coated films may be compared separately or simultaneously to similar previously-prepared or contemporaneously-prepared partially and fully pigmented second (viz., reference) mixtures and coated films. A color strength or strengths may then be determined based on the assessment of pairs, combinations or all of the recited films.

A variety of techniques may be used to arrive at an underlying color strength determination for each chosen illumination or measuring geometry. For example, color strength calculations and the assignment of weighting factors may be determined separately for each pigment in a colored batch containing a plurality of pigments. Also, color strength calculations may be performed by following the steps of the above-described maximum absorption method, but rather than determining the maximum absorption peak, the color strength for a given illumination or measuring geometry may be based on data for other wavelengths, e.g., the average for all wavelengths using Formula VII shown below:

$$CS = \frac{100}{31} \times \sum_{i=1}^{i=31} \left\{ \left( \frac{K^B(\lambda_i)}{S^B(\lambda_i)} \right) \Big/ \left( \frac{K^T(\lambda_i)}{S^T(\lambda_i)} \right) \right\}. \quad \text{VII}$$

The individual measurements may be further processed using optional correction factors (e.g., the Saunderson correction for reflections at the sample surface) to provide corrected K coefficients, S coefficients and chromatic color strengths with respect to wavelength for a plurality of combinations of illumination angles and measurement angles. If desired, other color models may be applied to different measurement angles or to different combinations of illumination angles and measurement angles. Exemplary such other models include those derived from or based on radiative transfer theory, as described in Chandrasekhar, Radiative Transfer, Dover Publications (1960), including the so-called 2-flux, 3-flux, 4-flux and multi-flux models, as shown, for example, in Industrial Color Physics, chapter 3.4.2, Georg A. Klein, Springer (2010). Any of these models may be adapted for use in the disclosed apparatus and method, bearing in mind that as described they typically involve color strength determinations made at only a single measuring geometry.

There are other visual appearance parameters aside from reflection or absorption data that may have a relation to or bearing upon color strength. For example, metallic effect pigments sometimes provide a textured visual impression often referred as graininess or coarseness (under diffuse illumination) and glint or sparkle under directional illumination. Color strength differences between colored batches containing effect pigments may be accentuated by texture differences between such batches. These color strength differences may be reduced by adapting the color strength determinations described above so that they are also based on or partly based on texture measurements. More generally, color strengths for colored batches containing effect pigments may be determined at a plurality of illumination or measuring angles based on any relevant single angle color strength determination method and any relevant appearance data.

A variety of effect pigments may be employed in the disclosed colored batches and finished coating formulations. Exemplary effect pigment particles typically will have an elongated shape (e.g., a flake shape) at least a portion of which provides an at least partially reflective flat surface. Effect pigments may for example be obtained from a variety of natural or synthetic materials, may contain inorganic, organic or both organic and inorganic components, may both reflect and refract light, may be lamellar, and may contain layers that provide an interference or color-shifting optical stack. Representative effect pigments include metal oxide-coated pigments employing flake substrates made from materials such as alumina, fluorophlogopite, glass, kaolin, mica, silica and other substrate materials that will be familiar to persons having ordinary skill in the art. Suitable metal oxide coatings may be made from materials such as chromium oxide, iron oxides (e.g. ferric oxide), magnesium fluoride, silicon dioxide, tin oxide, titanium oxides (e.g. titanium dioxide), titanium oxynitrides, zirconium oxide and other metal oxides that will be familiar to persons having ordinary skill in the art. The thickness of the metal oxide coating may for example be controlled so as to impart angle-dependent coloration, via one or more of interference phenomena, reflection phenomena or absorption phenomena, to light reflected from the underlying flake substrate. The metal oxide coating preferably covers all surfaces including edges of the flake substrate. The substrate may in some embodiments be coated with alternating layers of a high refractive index metal oxide such as ferric oxide, titanium dioxide or a titanium oxynitride and a low refractive index material such as silicon dioxide or magnesium fluoride. The effect pigment flakes may for example have aspect ratios of at least 20:1 or at least 30:1 and less than 150:1 or less than 100:1, and may for example have average particle lengths, widths or both lengths and widths of at least about 5, at least about 10 or at least about 15 µm and up to about 100, up to about 80 or up to about 40 µm. A variety of suitable effect pigments are commercially available, including pigments from BASF, EMD Performance Materials, Merck KGaA, Toyal Europe and other suppliers that will be familiar to persons having ordinary skill in the art.

A variety of conventional colored pigments or dyes may be used, optionally together with the disclosed effect pigments, in the disclosed colored batches. Exemplary such colored pigments or dyes include naturally occurring or synthetic pigments based on metals, metal salts and metal oxides, organometallic compounds that can be dispersed in the binder, and naturally occurring or synthetic dyes based on organic compounds that can be dissolved in the binder. Exemplary metals include aluminum powders, bronze powders, copper powders, tin powders and zinc powders. Exemplary metal salts or metal oxides include titanium dioxide, iron oxide powders, iron phosphate powders and oxide-coated (e.g., titanium oxide-coated) particles. Other exemplary pigments or dyes include carbon black, phthalocyanine blue, phthalocyanine green, carbazole violet, anthrapyridine, azo orange, flavanthrone yellow, isoindoline yellow, azo yellow, indanthrone blue, dibromoanthanthrone red, perylene red, azo red, anthraquinone red, quinacridone red and other pigments or dyes that will be familiar to persons having ordinary skill in the art. Non-infrared-absorptive dark pigments like those described in U.S. Pat. No. 8,746,291 B2 (Hertz et al.) may also be employed.

Expressed on a dried solids weight basis for either a liquid or powder colored batch, the effect pigments may for example represent at least about 0.1, at least about 0.5 or at least about 1 wt. percent and up to about 20, up to about 15 or up to about 10 wt. percent of the colored batch dried solids weight. Preferably the total pigment or dye amount (viz., effect pigment and optional additional colored pigment or dye) in the batch is at least about 0.1, at least about 0.5 or at least about 1 wt. percent and up to about 40, up to about 30 or up to about 20 wt. percent of the colored batch dried solids weight.

The disclosed colored batches may also contain flop additives (for example wax dispersions, silica particles or mica flakes) that influence or control the orientation of the effect pigments and consequently the angle dependence of the resulting colored batch appearance. Suitable flop additives are available from Byk-Chemie and a variety of other suppliers. Wax dispersions represent a preferred flop additive, and if used may for example represent on a dry solids basis at least about 0.1 or at least about 0.5 wt. %, and up to about 10 or up to about 5 wt. % of the colored batch. The types and amounts of these and other flop additives will be familiar to those having ordinary skill in the art.

The disclosed colored batches may also contain extender pigments. Exemplary extender pigments include precipitated barium sulfate, barium carbonate, gypsum, clay, white carbon, diatomaceous earth, talc, magnesium carbonate, and alumina white powders. The types and amounts of such extender pigments will be familiar to those having ordinary skill in the art.

A variety of film-forming binders may be used in the disclosed colored batches. Exemplary binders include waterborne polymers and solution polymers, for example latex polymers, alkyds, acrylic copolymers, styrene/acrylic copolymers, vinyl acetate copolymers, vinyl acetate/acrylic copolymers, vinyl versatic acid ester/acrylic copolymers, ethylene/vinyl acetate copolymers, styrene/butadiene copolymers, polyesters, polyurethanes, polyamides, epoxy esters, polyureas, polysiloxanes, silicones, fluorinated copolymers such as vinylidene fluoride, blends of any such binders, and other binders that will be familiar to persons having ordinary skill in the art. The binder may be an electrostatically-applied binder (e.g., a cathodic electrodepositable binder), or may be a multicomponent (e.g., two component) chemically-cured reactive system such as an isocyanate-polyamine, isocyanate-polyol, epoxy-polyamine, carbodiimide-polyacid, aziridine-polyacid, melamine-polyol, or urea formaldehyde-polyol system. The binder may also or instead be a curable system that hardens by exposure to light or other radiant energy in the presence of a suitable catalyst or initiator. Exemplary hardenable binders are described for example in U.S. Pat. No. 6,165,621 (Kasari et al.) and U.S. Pat. No. 7,947,777 B2 (Haubennestel et al.) Expressed on a dried solids weight basis, the binder may for example represent at least about 60, at least about 70 or at least about 80 wt. percent and up to about 95, up to about 98 or up to about 99 wt. percent of the colored batch.

A liquid colored batch may contain a suitable volatile carrier, e.g., water in a waterborne composition and one or more solvents in a solvent-borne composition. Cosolvents may also be employed in waterborne or solvent-borne compositions. Exemplary carriers and cosolvents will be familiar to persons having ordinary skill in the art. A finished liquid coating composition may for example contain at least about 50 or at least about 60 wt. percent and up to about 90 or up to about 85 wt. percent total carrier and cosolvent based on the total colored batch weight.

The colored batch may contain one or more conventional coating composition adjuvants that will be familiar to persons having ordinary skill in the art. Exemplary other adjuvants that may be used include anti-cratering agents, biocides, coalescents, curing indicators, dispersants, fungicides, heat stabilizers, leveling agents, light stabilizers, mildewcides, optical brighteners, plasticizers, preservatives, surfactants, thickeners or other rheology modifiers, ultraviolet light absorbers and wetting agents. Representative adjuvants include those described in Koleske et al., Paint and Coatings Industry, April, 2003, pages 12-86. The types and amounts of such other adjuvants will be familiar to persons having ordinary skill in the art, and often will be empirically selected.

The invention is further illustrated in the following non-limiting examples, in which all parts and percentages are by weight unless otherwise indicated.

Example 1

Thirteen batches of BEROBASE™ 513 metallic (a solvent-borne mixing color containing an aluminum flake effect pigment for use in 500 Series acrylic base paints from DeBeer Refinish) were prepared and subjected to color strength analysis by a panel of five expert technicians. Visual observations were done in a lab environment, with the experts performing pair-wise comparisons of batch and reference let-downs. The experts were free to rotate the samples to judge color angle dependence, and to use approximate diffuse (daylight) illumination as well as directional spot illumination. Each expert determined a single color strength value $CS_v$, and the resulting visual color strength was determined by averaging the 5 visual judgments using Formula VIII shown below:

$$CS^{Visual} = \tfrac{1}{5}\Sigma_{v=1}^{5} CS_v \qquad \text{VIII.}$$

A BYK-Mac™ i COLOR instrument was used to measure the reflection spectra of the batch using illumination at 45° with respect to the normal line N shown in FIG. 1 and measurements at six angles of −15, 15, 25, 45, 75 and 110° with respect to the 0° specular angle R shown in FIG. 1. Using the measured reflection spectra, the color strength values $CS_g$ were calculated for each of the six measuring geometries according to the averaging method in Formula VII above. The six color strength values for each batch were assigned equal weighting factors $W_g$=0.167 and used to calculate an instrumented color strength value for each batch using Formula IX shown below:

$$CS^{Calculated} = \Sigma_{g=1}^{6} W_g * CS_g \qquad \text{IX.}$$

Figure 4:
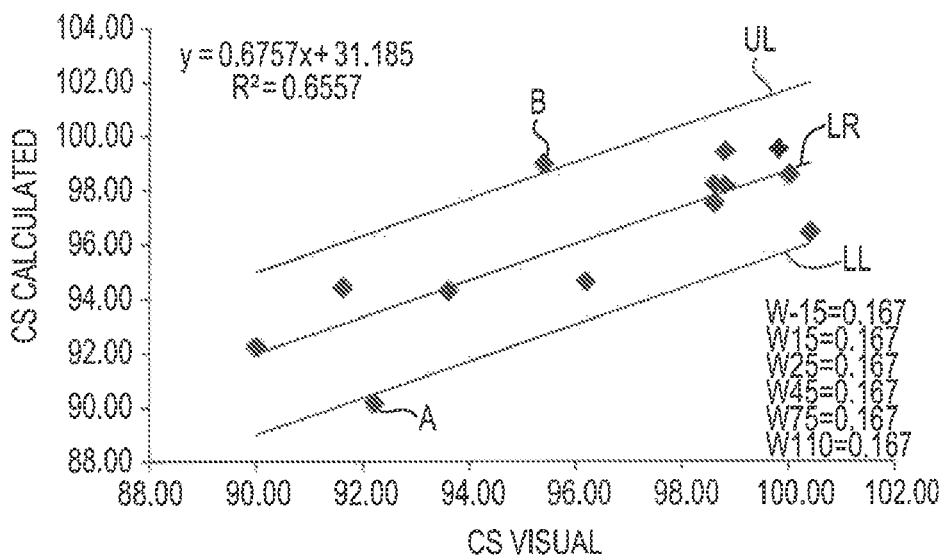
FIG. 4 through FIG. 9 are graphs comparing visual and calculated color strengths.

Index g in Formula IX refers to the measuring angles −15, 15, 25, 45, 75 and 110° respectively. The $CS^{Calculated}$ values and consensus visual measurement values $CS^{Visual}$ were plotted as X,Y data points as shown in FIG. 4. Linear regression line LR in FIG. 4 represents a best fit for the X,Y data points, and has the equation Y=0.6757X+31.185 with an $R^2$ coefficient of 0.6557. Upper tolerance boundary line ("UL") and lower tolerance boundary line ("LL") in FIG. 4 respectively represent instrumented color strength values that are ±3% of the values on line LR. The weighting factors $W_g$ are shown below and to the right of line LL. FIG. 4 shows that if Line LR is assumed to represent a plot of consensus visually-determined color strengths vs. instrumented color strength measurements, and if lines UL and LL are assumed to represent a desired ±3% tolerance for closeness of the instrumented value to the visual value, then at least data points A and B in FIG. 4 would be outside the UL and LL boundaries. This suggests that the batches corresponding to A and B are out of tolerance and will need at least one corrective action to fall within the tolerances.

Figure 5:
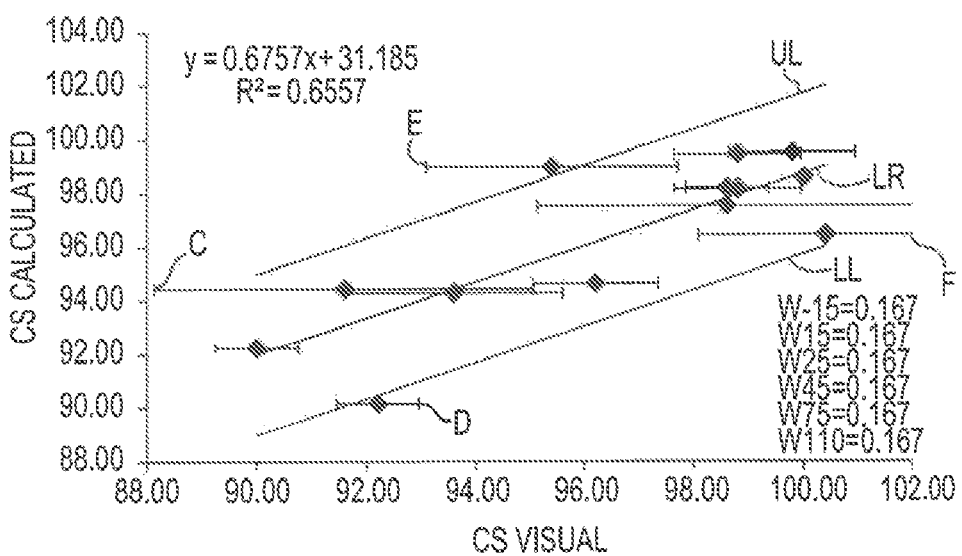

In a further comparison shown in FIG. 5, the 95% reliability interval for the visual assessments was calculated based on the variances of the 5 judgments for each batch. This was used to construct error bars for the $CS^{Visual}$ measurements in FIG. 4. FIG. 5 shows that for observations C, D, E and F there is a likelihood that they may fall outside the UL and LL boundaries. This suggests that the correlation between the $CS^{Visual}$ and $CS^{Calculated}$ values was not optimal with respect to the defined tolerances.

Figure 6:
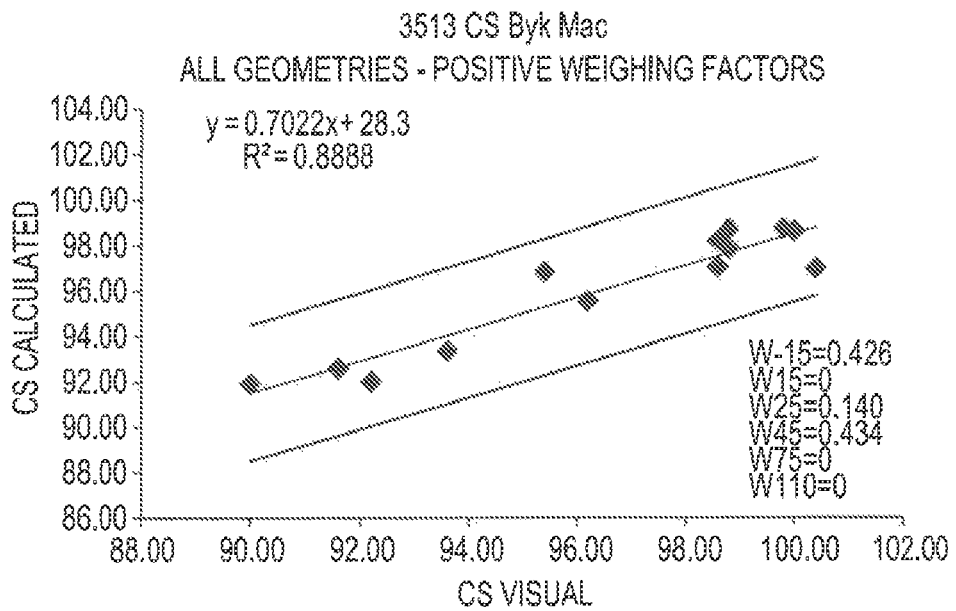

In FIG. 6, the same approach as in FIG. 4 was employed, but the calculated color strength was based on angle dependent positive weighting factors $W_g$ determined via a bounded linear regression method, resulting in the weighting factors values shown in FIG. 6. Identifying labels for the linear regression line, upper tolerance boundary line and lower tolerance boundary line have been omitted in the interest of clarity, it being understood that the labels will be similar to those used in FIG. 4. In this example, all data points are within the tolerances, suggesting a much better correlation between the $CS^{Visual}$ and $CS^{Calculated}$ values. The best fit was described by the equation Y=0.7022X+28.3 with an $R^2$ coefficient of 0.8889. The data in FIG. 6 also suggests that for this particular color, it is not necessary to include measuring data for all available measuring angles, as some of the weighting factors are zero.

Figure 7:
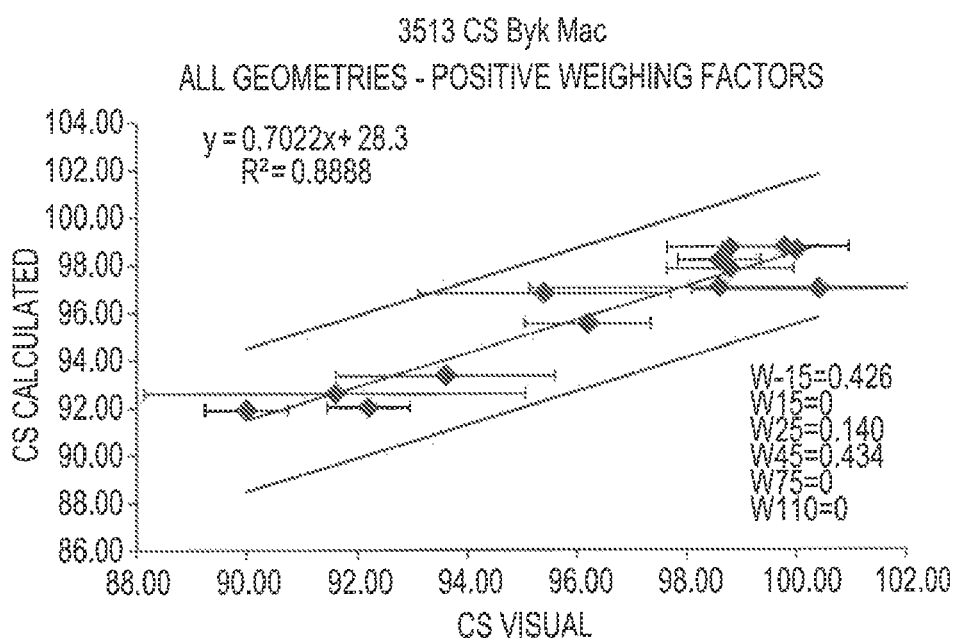

In a further comparison shown in FIG. 7, the 95% reliability interval for the visual assessments was used to construct error bars for the $CS^{Visual}$ measurements in FIG. 6. Identifying labels for the linear regression line, upper tolerance boundary line and lower tolerance boundary line have been omitted in the interest of clarity, it being understood that the labels will be similar to those used in FIG. 5. FIG. 7 shows that for all observations, there is a likelihood that they will fall within the UL and LL boundaries. This suggests that the correlation between the $CS^{Visual}$ and $CS^{Calculated}$ values was very good with respect to the defined tolerances.

Figure 8:
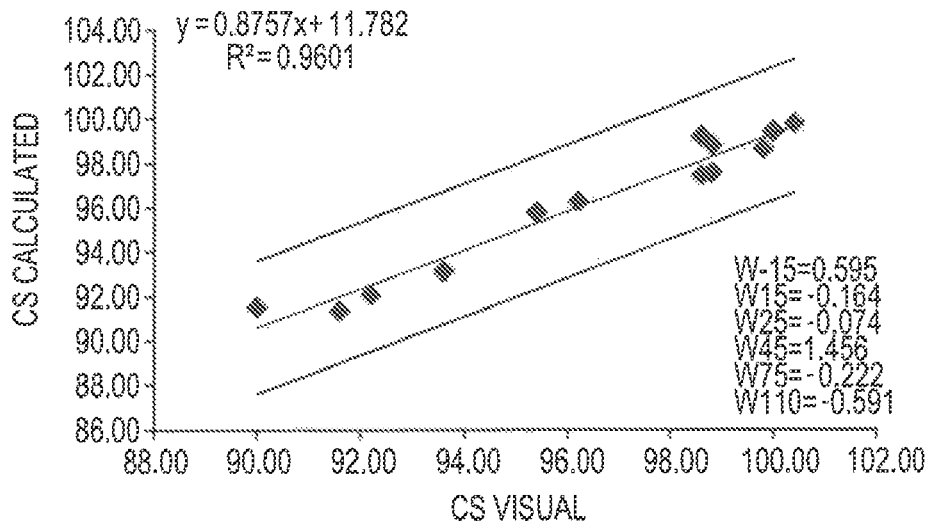

In FIG. 8, the same approach as in FIG. 6 was employed, but the calculated color strength was based on angle dependent weighting factors $W_g$ determined via a non-bounded linear regression method (thus allowing the weighting factors to become negative), resulting in the weighting factors shown in FIG. 8. In this example, all data points are again within the UL and LL boundaries, suggesting a good correlation between the $CS^{Visual}$ and $CS^{Calculated}$ values. The best fit was described by the equation Y=0.8757X+11.782 with an $R^2$ coefficient of 0.9601. Due to the absence of bounding, the fit is even better than in FIG. 6.

Figure 9:
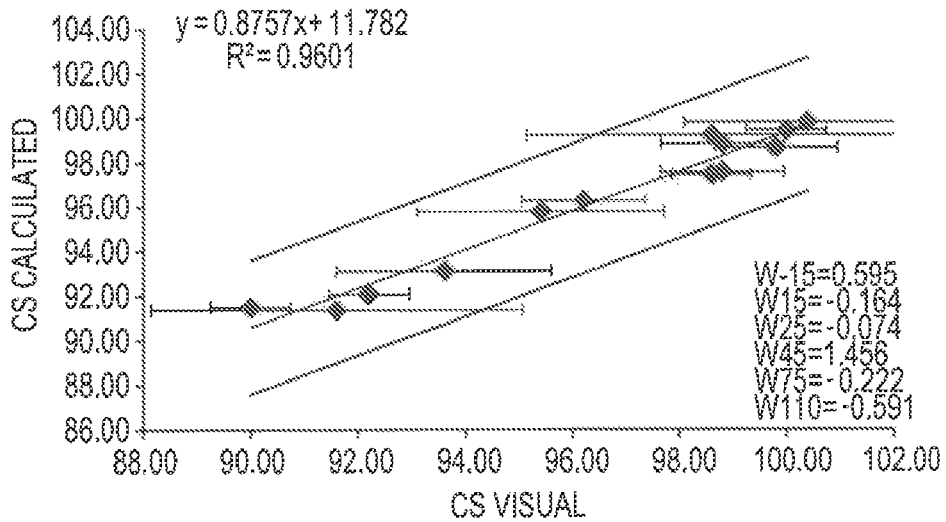

In a further comparison shown in FIG. 9, the 95% reliability interval for the visual assessments was used to construct error bars for the $CS^{Visual}$ measurements in FIG. 8. FIG. 9 shows that for all observations, again there is a likelihood that they will fall within the UL and LL boundaries. This suggests that the correlation between the $CS^{Visual}$ and $CS^{Calculated}$ values was also very good with respect to the defined tolerances.

Any of the weighting factors shown in FIG. 4 through FIG. 9, and especially those in FIG. 6 through FIG. 9, could provide improved instrumented color strength measurements useful for accepting, rejecting or adjusting the color strength of a colored batch.

Having thus described preferred embodiments of the present invention, those of skill in the art will readily appreciate that the present teachings may be applied to yet other embodiments within the scope of the attached claims. The complete disclosures of any patents, patent documents, or other publications referred to herein are incorporated by reference as if individually set forth.

The invention claimed is:

1. A method for measuring the color strength of a colored batch, the method comprising:
   a) coating onto a substrate a portion of a first colored batch comprising one or more pigments dispersed in either or both of a carrier and binder, the first colored batch optionally including one or more effect pigments, to form a coated test film;
   b) optionally hardening the test film;
   c) illuminating the test film and measuring the intensity of light reflected or absorbed by the test film at a plurality of combinations of illumination angle and measurement angle, and at one or more wavelengths;

d) calculating a plurality of color strengths for the test film at such plurality of combinations of illumination angle and measurement angle, and at such one or more wavelengths;

e) determining a composite color strength for the test film by applying non-uniform weighting factors to such plurality of color strengths.

2. The method according to claim 1, wherein the first colored batch comprises a liquid coating composition.

3. The method according to claim 1, wherein the first colored batch comprises a powder coating composition.

4. The method according to claim 1, wherein the color and intensity of light reflected or absorbed by the test film are determined using a plurality of measurement angles.

5. The method according to claim 1, wherein the color and intensity of light reflected or absorbed by the test film are determined using a plurality of illumination angles.

6. The method according to claim 1, wherein the color and intensity of light reflected or absorbed by the test film are determined using a plurality of illumination angles and a plurality of measurement angles.

7. The method according to claim 1, wherein the color and intensity of light reflected or absorbed by the test film are determined at a plurality of wavelengths.

8. The method according to claim 1, wherein the non-uniform weighting factors are all positive or zero values.

9. The method according to claim 1, wherein the non-uniform weighting factors are a mixture of positive values, negative values and optionally zero values.

10. The method according to claim 1, wherein the color and intensity of light reflected or absorbed by the test film are based on or partly based on measuring graininess or coarseness under diffuse illumination.

11. The method according to claim 1, wherein the color and intensity of light reflected or absorbed by the test film are based on or partly based on measuring glint or sparkle under directional illumination.

12. The method according to claim 1, wherein the color strength for the test film is calculated based on a maximum absorption peak for a plurality of combinations of illumination angle, measurement angle and wavelength.

13. The method according to claim 1, wherein the color strength for the test film is calculated based on a maximum absorption peak for at least one combination of illumination angle and measurement angle, and averaged over a plurality of wavelengths.

14. The method according to claim 1, wherein the first colored batch contains a plurality of pigments and the color strength calculations and weighting factors are determined separately for each pigment in the first colored batch.

15. The method according to claim 1, wherein the first colored batch contains effect pigment flakes having an aspect ratio of at least 20:1.

16. The method according to claim 1, wherein the first colored batch contains pigment particles having average particle diameters of about 5 μm and to about 100 μm.

17. The method according to claim 1, further comprising:
comparing the composite color strength to one or more historic or contemporary composite color strengths obtained from one or more similarly coated and measured reference films made from one or more previously-prepared or contemporaneously-prepared reference colored batches; and at least one of:
performing one or more of accepting, rejecting, mixing, milling or adjusting the composition of a remaining portion of the first colored batch, or adding to such remaining portion non-effect pigments, effect pigments, carrier, binder, or non-effect or effect pigments dispersed in either or both of a carrier and binder, to provide a third colored batch whose similarly-measured composite color strength is within a desired tolerance of the reference colored batch composite color strength.

18. The method according to claim 17, comprising adding to such remaining portion non-effect pigments, effect pigments, carrier, binder, or non-effect or effect pigments dispersed in either or both of a carrier and binder, to provide a third colored batch whose similarly-measured composite color strength is within a desired tolerance of the reference colored batch composite color strength.

19. The method according to claim 17, comprising accepting, milling, or adjusting the composition of such remaining portion.

20. The method according to claim 1, further comprising adjusting a color strength of the first colored batch by subjecting the first colored batch to milling, adding additional effect pigments to the first colored batch, or adding additional binder to the first colored batch.

* * * * *